United States Patent
Melnick et al.

(10) Patent No.: US 12,149,543 B1
(45) Date of Patent: Nov. 19, 2024

(54) CROWDSOURCED BAYESIAN PACKET ANALYSIS FOR DETECTING ANOMALIES IN NETWORK PACKET HEADER DATA ASSOCIATED WITH A USER'S SMART DEVICE

(71) Applicant: EVERYTHING SET INC., Berkeley, CA (US)

(72) Inventors: Michael D. Melnick, Brighton, NY (US); David L Knudsen, Saint Helena, CA (US)

(73) Assignee: EVERYTHING SET INC., Oakland, CA (US)

( * ) Notice: Subject to any disclaimer, the term of this patent is extended or adjusted under 35 U.S.C. 154(b) by 296 days.

(21) Appl. No.: 17/677,231

(22) Filed: Feb. 22, 2022

(51) Int. Cl.
*H04L 9/40* (2022.01)
*G06F 18/2415* (2023.01)

(52) U.S. Cl.
CPC .... *H04L 63/1416* (2013.01); *G06F 18/24155* (2023.01); *H04L 63/0876* (2013.01); *H04L 63/1425* (2013.01); *H04L 63/145* (2013.01); *H04L 63/20* (2013.01)

(58) Field of Classification Search
CPC ............. H04L 63/0876; H04L 63/1416; G06F 18/24155
See application file for complete search history.

(56) References Cited

U.S. PATENT DOCUMENTS

| | | | |
|---|---|---|---|
| 9,349,103 B2 | 5/2016 | Eberhardt, III et al. | |
| 9,537,876 B2 | 1/2017 | Kelekar | |
| 9,621,517 B2 | 4/2017 | Martini | |
| 9,838,292 B2 * | 12/2017 | Polychronis | H04L 43/08 |
| 9,984,365 B2 | 5/2018 | Desai et al. | |
| 10,063,585 B2 * | 8/2018 | Salajegheh | H04L 63/0421 |
| 10,142,122 B1 | 11/2018 | Hill et al. | |
| 10,454,950 B1 | 10/2019 | Aziz | |
| 10,587,633 B2 | 3/2020 | Muddu et al. | |
| 11,057,409 B1 * | 7/2021 | Bisht | H04L 43/04 |
| 11,184,386 B1 | 11/2021 | Schroeder et al. | |
| 11,658,863 B1 | 5/2023 | Salinas et al. | |

(Continued)

OTHER PUBLICATIONS

Li et al., "Crowdsourcing based large-scale network anomaly detection", 2018, IEEE, pp. 1-6.*

(Continued)

*Primary Examiner* — William S Powers
(74) *Attorney, Agent, or Firm* — Panitch Schwarze Belisario & Nadel LLP

(57) ABSTRACT

Anomalies are detected in network packet header data associated with a user's smart device that is in communication with one or more external sources via an electronic network. The user's smart device has one or more device classifications. Bayesian priors are stored of network traffic obtained from crowdsourced network packet header data for a plurality of smart devices having one of the same device classifications as the user's smart device. Network traffic obtained from network packet header data for the user's smart device is captured. The network traffic for the user's smart device is compared with the Bayesian priors and any anomalies are identified. The anomalies indicate potential abnormal data communication behavior regarding the user's smart device.

6 Claims, 10 Drawing Sheets

(56) References Cited

U.S. PATENT DOCUMENTS

| | | | |
|---|---|---|---|
| 2009/0265784 A1* | 10/2009 | Waizumi | H04L 63/1425 |
| | | | 703/2 |
| 2010/0285820 A1 | 11/2010 | Jozwiak et al. | |
| 2014/0181972 A1* | 6/2014 | Karta | H04L 63/1416 |
| | | | 726/23 |
| 2015/0033340 A1* | 1/2015 | Giokas | H04L 63/1433 |
| | | | 726/23 |
| 2015/0163121 A1* | 6/2015 | Mahaffey | H04L 41/142 |
| | | | 707/687 |
| 2016/0006753 A1 | 1/2016 | McDaid et al. | |
| 2016/0112374 A1 | 4/2016 | Branca | |
| 2016/0232358 A1 | 8/2016 | Grieco et al. | |
| 2018/0139179 A1 | 5/2018 | Ettema et al. | |
| 2019/0114404 A1 | 4/2019 | Nowak et al. | |
| 2019/0306182 A1 | 10/2019 | Fry et al. | |
| 2019/0380037 A1* | 12/2019 | Lifshitz | H04L 41/0893 |
| 2020/0044927 A1* | 2/2020 | Apostolopoulos | |
| | | | H04L 41/0895 |
| 2020/0366689 A1 | 11/2020 | Lotia et al. | |
| 2020/0396211 A1 | 12/2020 | Dobbins et al. | |
| 2021/0006583 A1 | 1/2021 | Ryabenkiy et al. | |
| 2021/0306341 A1 | 9/2021 | Tiwari et al. | |
| 2023/0188540 A1 | 6/2023 | Valluri et al. | |

OTHER PUBLICATIONS

Sanchez et al., "A Survey on Device Behavior Fingerprinting: Data Sources, Techniques, Application Scenarios, adn Datasets", 2021, IEEE Communications Surveys & Tutorials, vol. 23, No. 2, pp. 1048-1077.*

Bayesian Hierarchical Models in Ecology, Chapter 4 Bayesian Machinery, downloaded from:<https://bookdown.org/steve_midway/BHME/Ch3.html>, download date: Jan. 31, 2022, initial posting date: unknown, 12 pages.

D.4. dumpcap: Capturing with "dumpcap" for viewing with Wireshark, Appendix D. Related command line tools, downloaded from webpage: <https://www.wireshark.org/docs/wsug_html_chunked/AppToolsdumpcap.html>, download date: Feb. 1, 2022, initial posting date: unknown, 3 pages.

Fing DeveRecog API—Fing Device Recognition Cloud API, Fing Limited, Nov. 4, 2019, 10 pages.

Sivanathan et al. "Can We Classify an IoT Device using TCP Port Scan?" downloaded from: <https://www2.ee.unsw.edu.au/~hhabibi/pubs/conf/18iciafs-1.pdf> 2018 IEEE International Conference on Information and Automation for Sustainability (ICIAfS), Dec. 2018, 4 pages.

Shark(1) Manual Page, downloaded from: <https://www.wireshark.org/docs/man-pages/tshark.html>, download date: Feb. 1, 2022, initial posting date: unknown, 37 pages.

WAGO 852 Industrial Managed Switch Series Code Execution/Hardcoded Credentials, downloaded from web page: <https://vulners.com/packetstorm/PACKETSTORM:153278> download date: Feb. 3, 2022, initial posting date: unknown, 6 pages.

Wikipedia entry for "Man-in-the-middle attack." page last edited on Sep. 5, 2021, 7 pages.

Wikipedia entry for "Prior Probability," page last edited on Mar. 13, 2021, 8 pages.

Notice of Allowance issued Apr. 15, 2024 in U.S. Appl. No. 17/677,235.

* cited by examiner

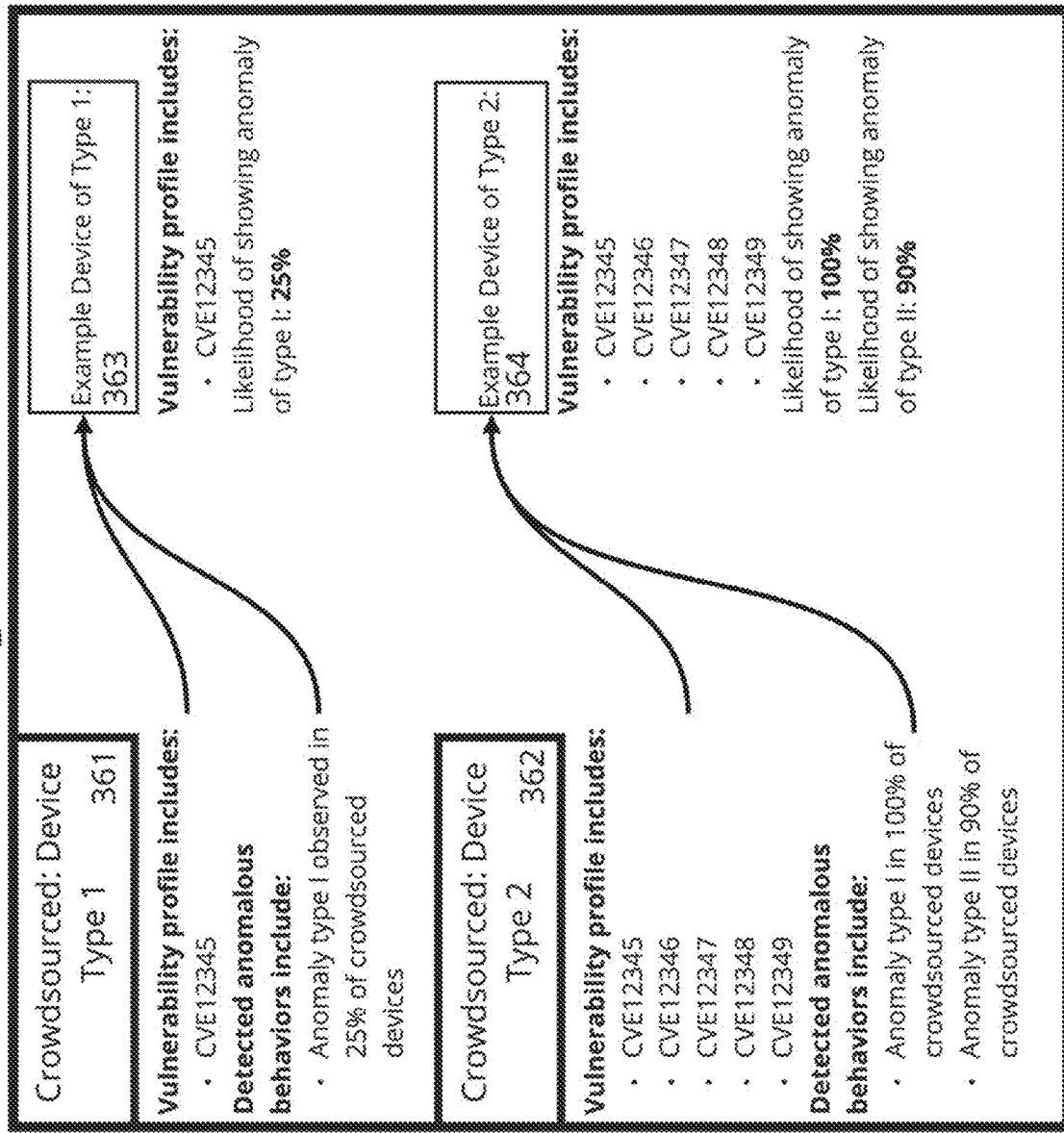

| ID | Timestamp | Port | Service name | Service product | Service version | Vulnerability ID | OS Version |
|---|---|---|---|---|---|---|---|
| 53153 | 2021-11-14T22:33:32.285219 | 22 | ssh | OpenSSH | 8.2p1 Ubuntu 4ubuntu0.1 | CVE-2020-15778 | 3.2 |
| 52108 | 2021-11-14T22:33:32.285219 | 22 | ssh | OpenSSH | 8.2p1 Ubuntu 4ubuntu0.1 | CVE-2020-15778 | 3.2 |
| 21536 | 2022-01-03T16:21:13.681514 | 22 | ssh | OpenSSH | 8.2p1 Ubuntu 4ubuntu0.1 | None | 3.3 |
| 63125 | 2022-01-03T16:21:13.681514 | 22 | ssh | OpenSSH | 8.2p1 Ubuntu 4ubuntu0.1 | None | 3.3 |

Figure 5

| crowdsourced vulnerability profile | anomalous behavior |
|---|---|
| 12345678 | |
| 22334567 | |
| 22334445 | |
| .. | .. |

Figure 6

CROWDSOURCED BAYESIAN PACKET ANALYSIS FOR DETECTING ANOMALIES IN NETWORK PACKET HEADER DATA ASSOCIATED WITH A USER'S SMART DEVICE

CROSS-REFERENCE TO RELATED APPLICATIONS

This application is related to U.S. patent application Ser. No. 17/677,235 filed Feb. 22, 2022 entitled "Selective inspection of network traffic associated with a plurality of network-connected smart devices using Man-In-The-Middle (MITM) gateway"; U.S. patent application Ser. No. 17/677,237 filed Feb. 22, 2022 entitled "Identification of one or more services for a user's network-connected smart device using a smart device fingerprint of the network-connected smart device"; and U.S. patent application Ser. No. 17/677,237 filed Feb. 22, 2022 entitled "Prediction of network vulnerability of a user's network-connected smart device using crowdsourced vulnerability profiles."

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

Smart devices are wired or wireless context-aware electronic devices which are capable of performing autonomous computing and connecting to other devices for data exchange. Examples of smart devices include smartphones, smart cars, smart thermostats, smart doorbells, smart locks, smart appliances (e.g., smart refrigerators, smart washers), phablets and tablets, smartwatches, smart bands, and smart key chains. The number of these smart devices that are running on home and business/office networks is exploding. At the same time, bad actors are hard at work figuring out how to hack into such networks to gain access to the smart devices so as to steal critical data that they may be transmitting and/or to disable or cripple their functionality. In some instances, the smart devices may be compromised by bad actors even before they are installed on the network. The owners or users of these smart devices are usually completely unaware of such hacking unless the smart device completely fails, in which case the owner or user might even conclude that the smart device is physically defective without realizing that the device failure was the result of a bad actor who may continue to compromise other devices on the user's network. While computer users and network operators typically run software to address the many conventional computer-related hacking activity, most users are completely ill-equipped to detect and thwart bad actors who attempt to infiltrate smart devices, especially those on home and business/office networks.

The present invention provides a plurality of different systems and methods for allowing users to better protect their smart devices which run on their home or business/office networks.

SUMMARY OF THE PRESENT INVENTION

One preferred embodiment of the present invention performs crowdsourced Bayesian packet analysis for detecting anomalies in network packet header data associated with a user's smart device. Another preferred embodiment of the present invention performs selective inspection of network traffic associated with a plurality of network-connected smart devices using a Man-In-The-Middle (MITM) gateway. Another preferred embodiment of the present invention identifies one or more services for a user's network-connected smart device using a smart device fingerprint of the network-connected smart device. Another preferred embodiment of the present invention performs prediction of network vulnerability of a user's network-connected smart device using crowdsourced vulnerability profiles.

BRIEF DESCRIPTION OF THE DRAWINGS

Preferred embodiments of the present invention will now be described by way of example with reference to the accompanying drawings:

FIG. 4 shows an example use of crowdsourced vulnerability profiles in accordance with preferred embodiments of the present invention.

FIG. 5 shows an example of collected data from a vulnerability report in accordance with preferred embodiments of the present invention.

FIG. 6 is a graphical depiction of anomalous behavior identified by crowdsourced vulnerability profiles in accordance with preferred embodiments of the present invention.

DETAILED DESCRIPTION OF THE INVENTION

Figure 1A:
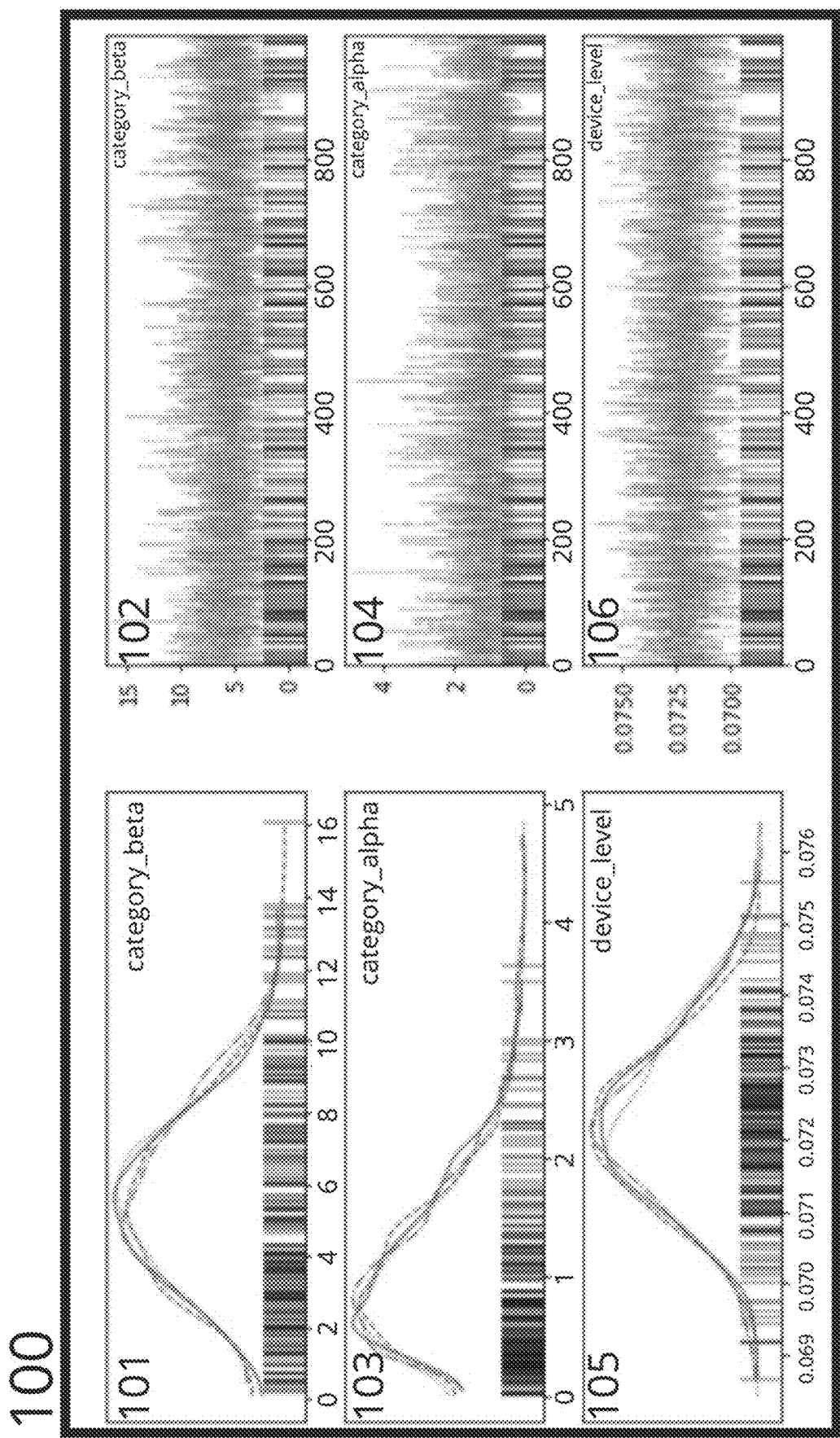
FIG. 1A-1D show various graphical illustrations related to Bayesian priors for use in preferred embodiments of the present invention.

Certain terminology is used herein for convenience only and is not to be taken as a limitation on the present invention.

The words "a" and "an", as used in the claims and in the corresponding portions of the specification, mean "at least one."

I. Definitions

The following definitions are provided to promote understanding of the present invention.

smart device—A smart device is a wired or wireless context-aware electronic device capable of performing autonomous computing and connecting to other devices for data exchange. Examples of smart devices include smartphones, smart cars, smart thermostats, smart doorbells, smart locks, smart refrigerators, phablets and tablets, smartwatches, smart bands, and smart key chains.

network-connected smart device—A network-connected smart device is a smart device which is connected to and communicates via, an electronic network, such as the Internet. The network-connected smart device is interchangeably referred to herein as a "smart device."

device classification—"Classification" is the action or process of classifying something according to shared qualities, attributes, or characteristics. As used herein, "device classification" refers to a shared characteristic or attribute of a network-connected smart device. The smart device may have a plurality of device classifications based on a specific taxonomy used for classification of the smart device. Non-exhaustive device classifications include a "device category," a "device type," a "device make," and a "device model," as described below. A smart device may have more or less device classifications than this example, depending upon the specific taxonomy used for the classification of the smart device.

device category—The device category is the category of a network-connected smart device. For example, the device category of an Apple iphone 13 is "mobile." The device category is interchangeably referred to herein as the "category type." The device category is thus one example of a device classification or characteristic.

device type—The device type is the type of network-connected smart device. Non-exhaustive examples of a device type include types of mobile devices (e.g., cellphones, tablets, laptops), and types of household appliances (smart refrigerator, smart washer, smart dryer), and other types of smart devices (e.g., smart doorbell, smart light bulb, and smart garage door). The device category of an Apple iphone 13 is "cellphone." The device type is thus another example of a device classification or characteristic.

device make—The device make is the make or brand of the network-connected smart device. For example, the make of a smart refrigerator may be Samsung. The make of a smart thermostat may be Google Nest. The device make of an Apple iphone 13 is "Apple." The device make is thus another example of a device classification or characteristic.

device model—The device model is the model of the network-connected smart device. For example, the model of a smart refrigerator may be Samsung Model #RF28R7551SR. The model of a smart thermostat may be Google Nest Model #T3007ES. The device model of an Apple iPhone 13 is "iPhone 13." The device model is thus another example of a device classification or characteristic.

device metadata—Metadata is data that provides information about other data, but not the content of the data. Accordingly, device metadata is data about the network-connected smart device. The device metadata includes the device classifications or characteristics discussed above, such as device category, device type, device make, and device model, as well as other device properties such as device operating system (OS) (the OS that executes in the device). The device metadata are saved inferences regarding device characteristics. Since device metadata are based on inferences, whereas the device characteristics are inherent to the device, the device metadata may potentially not be identical to the actual device characteristics due to imperfections in the inference process.

network traffic—Network traffic or data traffic is the data moving across a network at a given point of time. Network data in computer networks is mostly encapsulated in network packets, which provide the load in the network.

external source—An external source is an entity that a smart device communicates with. Some smart devices, such as a smart light bulb or smart garage door, typically only communicate with a single external source. Other smart devices, such as smartphones, communicate with a virtually unlimited number of external sources via apps and browsers.

prior probability—Also, referred to herein interchangeably as a "prior probability distribution," "Bayesian prior," or simply "the prior." In Bayesian statistical inference, a prior probability of an uncertain quantity is the probability distribution that would express one's beliefs about this quantity before some evidence is taken into account.

crowd sourced (also, referred to as "crowdsourced")—data attained in a "crowd sourced" (crowdsourced) manner is data that is generated not from a central source or database but is instead collected from many individual sources and synthesized. In common usage this may involve an individual human contributing their input actively, but as used herein this relates specifically to the passive contribution of targeted data from individual network devices to a central source.

II. Detailed Disclosure

A. Crowdsourced Bayesian Packet Analysis Anomaly Detection

One preferred embodiment provides a method of detecting anomalies in network packet header data associated with a user's smart device that is in communication with one or more external sources via an electronic network. The user's smart device has one or more device classifications. In one preferred embodiment, the method operates as follows:

1. Store in memory Bayesian priors of network traffic obtained from crowdsourced network packet header data for a plurality of smart devices having one of the same device classifications as the user's smart device;
2. Capture network traffic obtained from network packet header data for the user's smart device.
3. Compare the network traffic for the user's smart device with the Bayesian priors and identify any anomalies, wherein the anomalies indicate potential abnormal data communication behavior regarding the user's smart device.

To further illustrate the one or more device classifications, consider the following taxonomy in Table 1 related to a smart device for two different smart devices, namely, (i) a specific model of a Samsung smart refrigerator, and (ii) a $3^{rd}$ generation Nest Thermostat, version 3.4:

TABLE 1

| DEVICE CLASSIFICATION | Samsung smart refrigerator | 3rd generation Nest Thermostat |
|---|---|---|
| device category | smart home | smart home |
| device type | smart appliance | smart thermostat |
| device make | smart Samsung refrigerators | Nest |
| device model | Samsung Model #RF28R7551SR | Nest Gen. 3/version 3.4 |

In JSON format, the 3rd generation Nest Thermostat may appear as follows in memory:
{"device_category": "Smart Home",
"device_type": "thermostat",
"make": "nest",
"model": "Gen. 3/version 3.4"}

Here, for example, there are multiple device classifications for the 3rd generation Nest Thermostat. It may be classified as a smart home device, or a smart thermostat, or a Nest device, or a Nest Gen 3/version 3. Consider, for example, the three-step process described above wherein the device classification is the device category. In this example, the memory would store Bayesian priors of network traffic obtained from crowdsourced network packet header data for a plurality of smart devices having the same device category as the user's smart device (here, smart home). This network traffic would include other smart devices that are also "smart home" devices, such as smart refrigerators. After capturing network traffic obtained from network packet header data for the user's 3$^{rd}$ generation Nest Thermostat, this network traffic is then compared with the Bayesian priors and any anomalies are identified. The anomalies indicate potential abnormal data communication behavior regarding the user's 3$^{rd}$ generation Nest Thermostat.

The device classification is not limited to only a single device classification. For example, the same 3rd generation Nest Thermostat may undergo the same three-step process based on its device type. In this example, the memory would store Bayesian priors of network traffic obtained from crowdsourced network packet header data for a plurality of smart devices having the same device type as the user's smart device (here, smart thermostat). This network traffic would include other smart devices that are also smart thermostats (e.g., other brands of smart thermostats, other models of Nest smart thermostats). After capturing network traffic obtained from network packet header data for the user's 3rd generation Nest Thermostat (which is the same network traffic obtained in the example above). this network traffic is then compared with the Bayesian priors and any anomalies are identified. The anomalies indicate potential abnormal data communication behavior regarding the user's 3rd generation Nest Thermostat. These anomalies may differ from the anomalies identified in the example above due to the use of a different device characteristic.

Similarly, the same 3rd generation Nest Thermostat may undergo the same three-step process based on its device make. In this example, the memory would store Bayesian priors of network traffic obtained from crowdsourced network packet header data for a plurality of smart devices having the same device make as the user's smart device (here, Nest devices). This network traffic would include other smart devices that are also Nest devices (e.g., Nest thermostat, Nest webcams, or any other Nest-branded device), but which are not limited to a particular Nest model. After capturing network traffic obtained from network packet header data for the user's 3rd generation Nest Thermostat (which is the same network traffic obtained in the example above). this network traffic is then compared with the Bayesian priors and any anomalies are identified. The anomalies indicate potential abnormal data communication behavior regarding the user's 3rd generation Nest Thermostat. These anomalies may differ from the anomalies identified in the example above due to the use of a different device characteristic.

Similarly, this same process may be performed for the device model (device classification=device model) wherein the Bayesian priors are only those obtained from crowdsourced network packet header data for a plurality of Nest Gen. 3/version 3.4 thermostats, and the anomaly analysis is performed only for this specific model of Nest thermostat. Again, these anomalies may differ from the anomalies identified in the two examples above due to the use of a different device characteristic.

One example of an external taxonomy that is suitable for use in the present invention is produced by Fing Limited, located in Dublin, Ireland. This taxonomy consists of top level "groups" (e.g., "Mobile," "Audio & Video," "General IT," "Home Automation"), which are analogous to "device category," and a sublevel of "device types" (e.g., "Television" (within group=Audio and Video), "Laptop" (within group=General IT, "IP Camera" (within group=Home Automation). Other taxonomies are within the scope of the present invention.

Figure 1B:
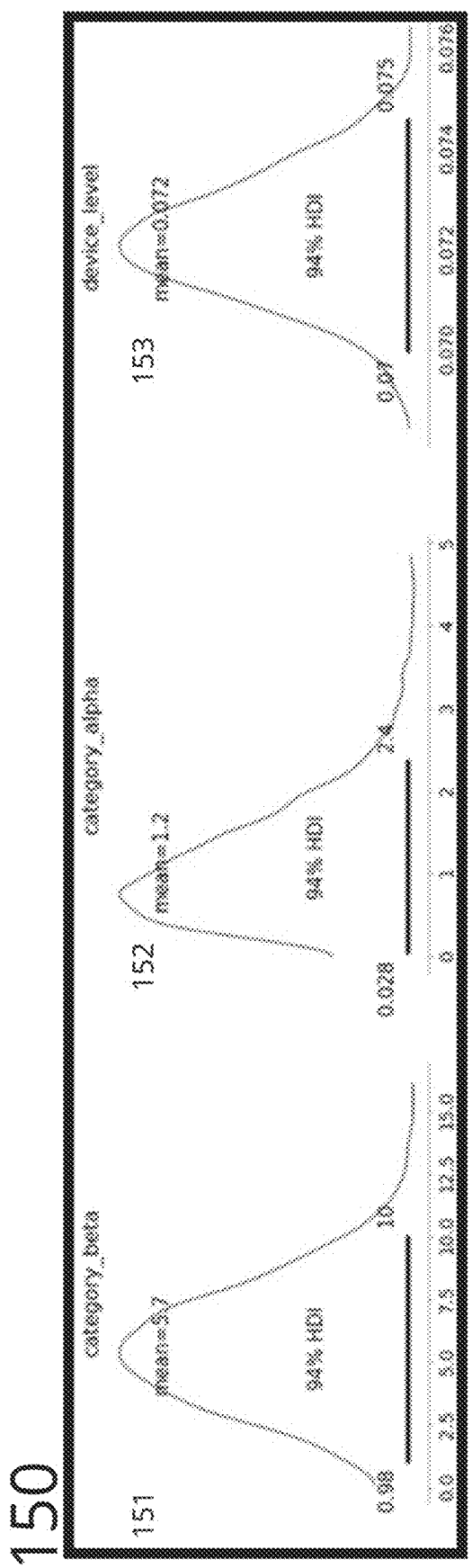

FIG. 1A, FIG. 1B, and the source code and pseudocode discussed below, illustrate and describe Bayesian priors of network traffic obtained from crowdsourced network packet header data for a plurality of smart devices having one of the same device classifications as the user's smart device. As explained above, these Bayesian priors are stored in memory and then used in the various comparisons to identify anomalies with respect to a user's smart device. Memory storage details are described below with respect to data model details.

Data Model Details:

Data is an array of value where each value corresponds to a summary quantity of packet sizes (like sum, mean, or median within a defined time period, such as 1 hour or 24 hours), for a specific device, device type, and category.

Data is n-dimensional based upon the level of hierarchy that is being analyzed. For the below example that looks at individual device behavior against device type and category type, data is individual device x device type x device category

```
# Basic intermediate hierarchical model of packet size
    category_alpha = HalfNormal("category_alpha",
            sd=3)
    category_beta = Normal("category_beta",
            mu=4,
            sd=3)
    device_level = Gamma("device_level",
            alpha=category_alpha,
            beta=category_beta)
    individual_mu = Poisson("indiv_mu",
            mu = device_level,
            observed = analysis_array)
```

Run Sampling to produce distributions, start by running 1000 samples using Markov Chain Monte Carlo (MCMC)

trace=sample(1000)

Sampling produces posterior distributions for the above variables, and this provides diagnostic output of both the MCMC chains and the resulting distributions to use as Bayesian priors on further analysis.

End of data model details

FIG. 1A shows sample posterior distributions for category_beta, category_alpha, and device_level. The graphs on the lefthand side of FIG. 1A (101, 103, 105) show the posterior distributions. The graphs on the righthand side of FIG. 1A (102, 104, 106) show the MCMC chains.

Regarding the step of capturing network traffic obtained from network packet header data for the user's smart device, any suitable commercial product may be used for this purpose. One suitable commercially available software for capturing network packet data for the user's smart device includes Wireshark, its command-line utility tshark, or its underlying capture system dumpcap. Any of these will generate a standard capture format file in the pcapng format.

Table 2 illustrates a sample of the network packet header data for use in the comparison step described above, and more specifically, illustrates sample network packet header data output of tshark for a single packet:

TABLE 2

| | |
|---|---|
| Timestamp relative to packet collection start | 0.688051 |
| Source IP Address | 162.125.19.131 |
| Destination MAC Address | 98:ed:7e:6d:b3:f2 |
| Destination MAC Address | 192.168.4.22 |
| Protocol | TCP |
| Packet Size | 66 |

Figure 1C:
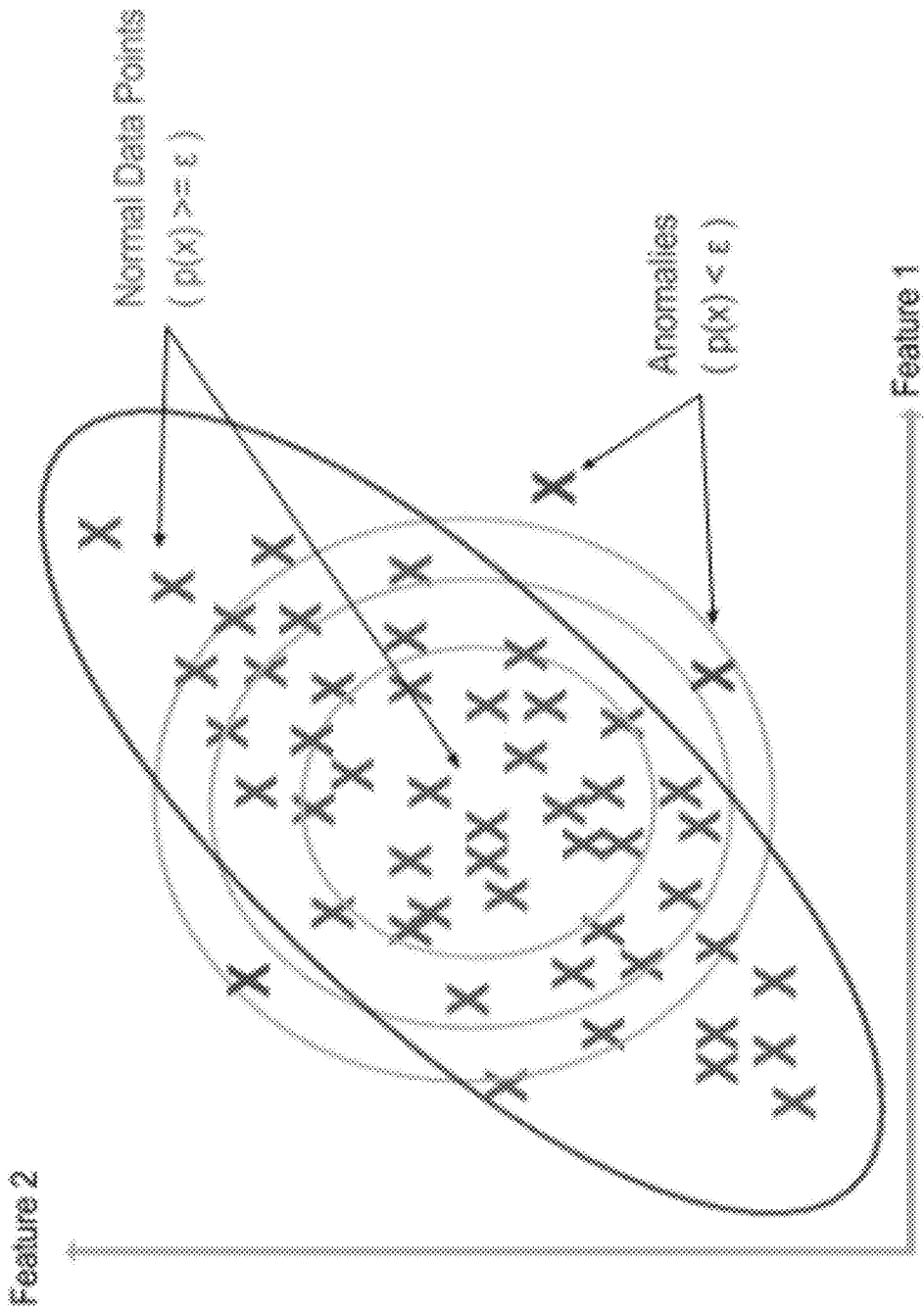
Figure 1D:
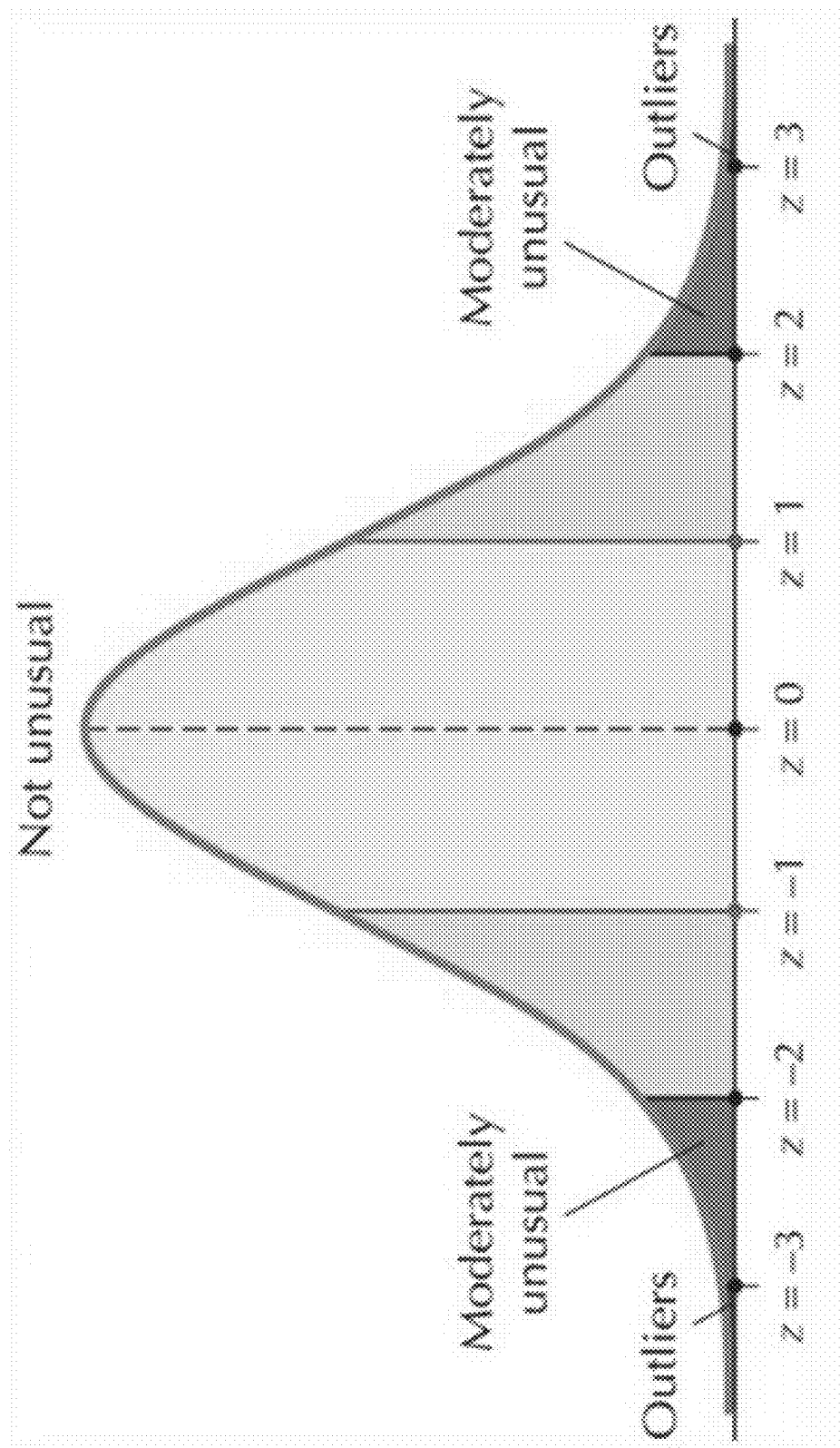

Regarding the step of identifying anomalies during the comparison process, FIG. 1C and FIG. 1D illustrate the overall concept. In these figures, potential anomalies are data points that are greater than +/−2 sigma. In FIG. 1C, the potential anomalies are the three data points outside of the large oval circle (two on the lower right, and one on the upper left of the x-y axes.

More specifically, anomalies can be defined based upon a specific relationship of a user's smart device to a given level of analysis. Referring again to FIGS. 1A and 1B, a threshold is defined for anomalistic behavior, such as below 94% HDI (high-density interval) (FIG. 1B, 151). Individual smart devices with metric numbers exceeding a single-tailed HDI in one direction (i.e., greater than the HDI on the higher magnitude tail) will be defined as an abnormally high/anomalistic metric for that device compared to that hierarchical level (i.e., when compared to devices of its type, or devices of its category).

In one preferred embodiment, the comparison of the network traffic for the user's smart device with the Bayesian priors is performed for the same time period (time window). For example, the comparison may occur between crowdsourced data collected between Jan. 1, 2022 and Jan. 30, 2022 and network traffic for the user's smart device collected during this same time period. However, if data from matching time periods is unavailable, data from different time periods may be used. In addition to data from matching time periods, data from different time periods may also be used in certain circumstances.

More specifically, all captured network packet data is timestamped both on collection as well as on ingestion into the data capture system of the present invention. Timestamps are used to ensure that time periods are compared appropriately based upon expected and measured differences in analytical regimes. For instance, a wide enough time window ensures that enough data is collected to smooth over small fluctuations due to data collection or usage. Similarly, a small enough time window is used that large seasonality changes, such as might be seen due to common academic breaks and their resulting effect on observed activity, are not incorrectly to indicate anomalistic behavior.

B. Auto-Responsive (User-Conscious) Man-In-the-Middle (Acting as a Gateway) Network Packet Collection Another preferred embodiment of the present invention provides a method for configuring a man-in-the-middle (MITM) gateway to selectively inspect network traffic associated with a plurality of network-connected smart devices for malicious network traffic. The MITM gateway is connected to a router which allows for communication between the plurality of network-connected smart devices and one or more external sources via an electronic network, such as the Internet. In one preferred embodiment, the method operates as follows:

1. The MITM gateway is configured to operate in a first mode or a second mode for each of the network-connected smart devices. The first mode configures the MITM gateway to perform inspection of network traffic associated with the respective network-connected smart device, whereas the second mode configures the MITM gateway to not perform any inspection of network traffic associated with the respective network-connected smart device.
2. Automatically detect, for each of the network-connected smart devices, when the MITM gateway operating in the first mode is adversely affecting the operation of a respective network-connected smart device.
3. Change the MITM gateway to operate in the second mode for a respective network-connected smart device when it is detected that the MITM gateway operating in the first mode is adversely affecting the operation of the respective network-connected smart device. As discussed in more detail below, a respective network-connected smart device is detected to be adversely affected by the MITM gateway when a performance metric of the respective network-connected smart device is detected as being below a predefined percentage or value.

Figure 2:
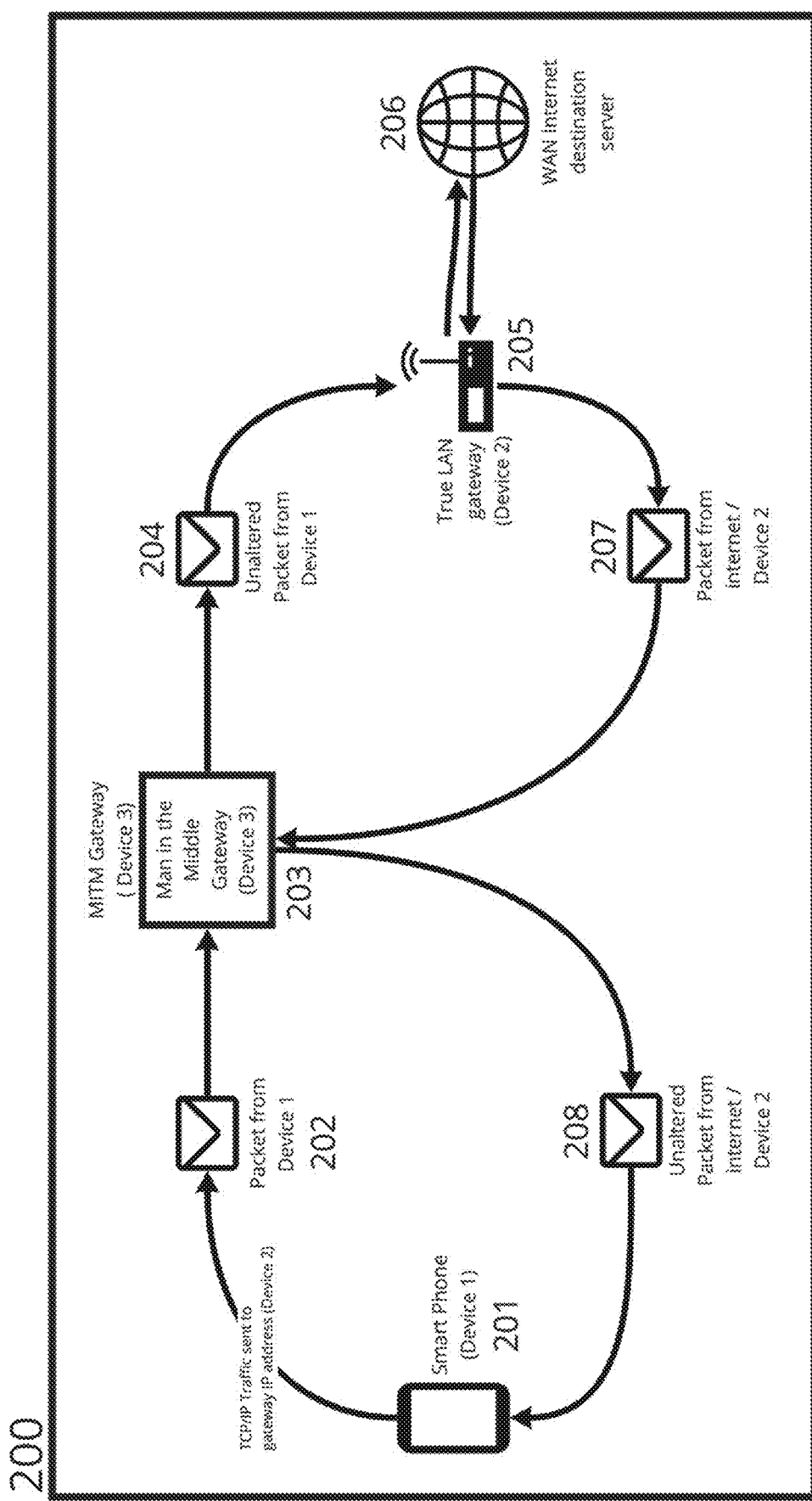
FIGS. 2 and 3A are schematic diagrams that show systems and communication flows in accordance with preferred embodiments of the present invention.

MITM gateways are well-known in the art and conventional MITM gateways may be modified to perform as described above. For example, U.S. Pat. No. 9,621,517 (Martini), which is incorporated by reference herein, discloses a MITM gateway that can be configured in different modes, including a mode where it does not perform any inspection of data (MITM gateway 204—Perform no inspect of data). However, this patent is silent regarding switching to this mode based on detection of performance degradation in the network. An MITM gateway that is suitable for use in the present invention may be one that builds on the MITM gateway of this patent, and which includes at least the following enhanced capabilities:

1. The MITM gateway of the present invention is not limited to specifying HTTP requests, and may use other protocols such as FTP.
2. Devices in the network that include the MITM gateway pass any protocol transmitted over Layers 2 or 3 as a transparent middleman. Consider, for example, a home network shown in FIG. 2 having three devices, referred to herein as devices 1, 2, and 3, wherein device 1 is a smart device (e.g., smartphone 201), device 2 is True LAN gateway 205, and device 3 is a MITM gateway 203. Device 1 sends SSH (Secure Shell) traffic 202 over TCP/IP to an internet-connected server 206 outside of the gateway (device 3). Device 3 will accept this traffic (202) before forwarding (as 204) to the true gateway (device 2). Device 3 will accept and forward traffic intended for device 1 that is incoming from the true gateway (device 2) as well (207 will be received by device 3 and forwarded as 208). This is regardless of protocol and regardless of source and destination devices.
3. The MITM gateway of the present invention may be used for any sort of network traffic, not just for serving webpages as described in U.S. Pat. No. 9,621,517.
4. The MITM gateway of the present invention does not attempt to interfere with traffic by serving potential alternative services or packets to those that are sent through the MITM gateway, which is one the features of the MITM gateway in U.S. Pat. No. 9,621,517.
5. The MITM gateway of the present invention is configured to drop incoming and outgoing data through the MITM gateway at its rule-based discretion. For example, if a packet is destined to a specific IP address that matches to an internal updated list of dangerous IP addresses, the device may drop that packet instead of forwarding it to the LAN gateway. This ability to drop incoming and outgoing data through the MITM gateway at its rule-based discretion is a functionality that is in addition to the selective removal of the MITM gateway from the network in accordance with preferred embodiments of the present invention.

While U.S. Pat. No. 9,621,517 discloses the ability to selectively turn on and off MITM functionality, it does not do so on a device-specific basis which is a feature of preferred embodiments of the present invention. To implement such a feature, each smart device is kept in an in-memory data structure keyed to its hardware address (MAC address) that contains several relevant features to its current network status including, but not limited to:

1. whether the traffic of the smart device is currently intercepted by the MITM gateway,
2. IP address of the smart device,
3. whether the smart device is allowed to be intercepted by the MITM gateway.

When external rules are met that allow the smart device to be intercepted by the MITM gateway, it is added to the current list of MITM-eligible devices. This in-memory list is checked at a short and regular interval, such as once per second. Eligible devices are intercepted by the MITM gateway, and ineligible devices are not.

When external conditions are met that indicate that a smart device may be adversely affected by MITM gateway interception (see below for thresholds and examples), a specific smart device may be removed from the list of eligible smart devices and will be then be routed directly to the true gateway without interception by the MITM gateway.

During spoofing, all TCP/IP traffic is routed through the MITM gateway device. This provides the MITM gateway access to statistics and metrics (collectively referred to herein as "performance metrics") about the traffic flowing to and from each smart device, and those statistics and metrics can be used to determine instances in which acting as a MITM gateway is adversely affecting a specific smart device. These statistics and metrics include, but are not limited to:

1. TCP retransmission percentages,
2. round-trip times (RTTs), and
3. ping latencies.

In certain cases, adversely affected smart devices are those that cross a predetermined threshold with respect to their performance metrics. TCP retransmission percentage (the number of TCP packets marked as retransmitted divided by the total number of TCP packets transmitted over a certain period of time, such as 60 seconds) is thresholded this way, where retransmission percentages of greater than 5 or 10 percent are an indication that a device could be transmitting data sub-optimally, and that the MITM gateway should attempt an alternative method or mode.

In other cases, baseline measurements are taken before MITM actions are taken and compared with measurements taken after MITM has been implemented for a specific smart device. Ping latency is measured this way, wherein a threshold increase of a given value, such as 50% higher latency after MITM action has been taken, may indicate that the MITM gateway should attempt an alternative method or mode.

In the embodiment described above, MITM gateway interception may be selectively turned on and off on a device-specific basis. For example, if performance metrics is being degraded for only one smart device in a home network, MITM gateway interception may be turned off for only that one smart device, but left on for the remaining smart devices in the home network. In another preferred embodiment of the present invention, the MITM gateway may be disrupting the entire home network, such as when there is high usage and the MITM gateway is overwhelming the network and degrading performance of the entire home network. In this scenario, it may be desirable to temporarily suspend operation of the MITM process for all smart devices on the home network. This alternative embodiment provides a method for configuring a MITM gateway to selectively inspect network traffic associated with a plurality of network-connected smart devices for malicious network traffic. The plurality of network-connected smart devices are connected to a user's network which includes a router. The MITM gateway is connected to the router which allows for communication between the plurality of network-connected smart devices and one or more external sources via an electronic network. The method operates as follows:

1. Configure the MITM gateway to operate in a first mode or a second mode. The first mode configures the MITM gateway to perform inspection of network traffic associated with the plurality of network-connected smart device, whereas the second mode configures the MITM gateway to not perform any inspection of network traffic associated with the plurality of network-connected smart device.
2. Automatically detect when the MITM gateway operating in the first mode is adversely affecting the operation of the user's network; and
3. Change the MITM gateway to operate in the second mode when it is detected that the MITM gateway operating in the first mode is adversely affecting the operation of the user's network. As discussed in more detail below, the operation of the user's network is detected to be adversely affected by the MITM gateway when a performance metric of the user's network is detected as being below a predefined percentage or value.

One method for selectively turning on and off the MITM gateway functionality for the entire user's network is via control of ARP (Address Resolution Protocol) packets. Delivery of altered ARP packets may be performed over either broadcast or multicast network systems. In these instances, both individual devices and the overall performance of the network are monitored, as described below. In instances where a threshold is crossed and network health appears to suffer due to MITM gateway interception, the MITM gateway will cease to send altered ARP packets to either the broadcast or multicast channels after sending the correct ARP packets for the true gateway. As a result, devices on the network will again send their traffic directly to the true gateway without interception by the MITM gateway.

One method for determining that the MITM gateway is adversely affecting the user's network is to take baseline measurements of network performance before MITM gateway actions are taken and compare the baseline measurements with measurements taken of network performance after MITM gateway interception has been implemented. Wide Area Network (WAN) throughput is measured this way, wherein a threshold increase of a given value, such as a 30% reduction in throughput after MITM gateway action has been taken may indicate that the MITM gateway should attempt an alternative method or mode, such as being turned off, since the entire network (and not just a single device) may be experiencing unexpected load from MITM gateway interception.

In the embodiments described above, the network-connected smart devices may all be located at the same physical site as the router. In alternative embodiments, one or more of the network-connected smart devices may be remotely located (i.e., not at the same physical site) with respect to the router.

In the embodiments described above, the MITM gateway may be configured to operate in the first mode upon initiation. Alternatively, the MITM gateway may be configured to operate in the second mode upon initiation, and then switched into the first mode upon one or more conditions being met. Thus, the MITM gateway may operate under multiple modes, allowing it to tailor its operation automatically to the network environment that it is placed in. These modes may include but are not limited to:

1. A device-by-device targeted interception method that allows the MITM gateway to intercept traffic to and/or from certain smart devices but not others.
2. A broadcast or multicast interception method that allows the MITM gateway to intercept all traffic to and/or from every smart device connected to that local network.
3. A time-limited version of mode #1 or mode #2 that activates only within desirable hours of the day. For instance, the MITM gateway shuts down MITM interception between daytime hours and then runs in mode #2 between the hours of 12:00 am and 6:00 am.
4. A gateway mode in which the MITM gateway serves DHCP (Dynamic Host Configuration Protocol) leases as the exclusive DHCP server on the local network.

The MITM gateway may base its state on empirical data collected to determine the proper running state. For instance, a MITM gateway that runs in mode #3 may do so because it has crossed a threshold causing more than five devices on a network to show more than 10% TCP retransmission. If this MITM gateway find lower than 10% TCP retransmission during the time-limited run, it may move from mode #3 back into mode #1.

In another embodiment, when the MITM gateway is operating in the second mode for a respective network-connected smart device, the MITM gateway may change back to operate in the first mode for the respective network-connected smart device after a predetermined time period has expired of operating in the second mode for the respective network-connected smart device. If the condition(s) that caused the MITM gateway to switch from the first mode to the second mode are detected again, then the MITM gateway will switch back to the second mode. Alternatively, mode switching may be based on a selected condition being detected, such as a performance metric of the user's network crossing above a predetermined threshold. Since the MITM gateway performs a valuable function within the user's network, it is desirable to have it functioning as much as possible, provided that it does not degrade network performance or smart device performance by an unacceptable amount.

In one preferred embodiment, the MITM gateway performs ARP spoofing in the first mode of operation. ARP packets are constructed either for each smart device being targeted for MITM gateway interception, consisting of protocol fields that define the following address data:

1. Sending MAC address
2. Sending IP address
3. Receiving MAC address
4. Receiving IP address The receiving MAC and IP addresses are those of the targeted device, and the sending MAC and IP address are the spoofed addresses indicating that the IP address of the original network gateway is located at the MAC address of the MITM gateway. These constructed packets are sent at a regular interval (such as every 1 second) to both the targeted devices and the original network gateway (with the reverse sending IP and MAC address indicating that the targeted device is located at the MAC address of the MITM gateway) to maintain the spoofed entries in an ARP table of the targeted device.

C. Smart (Iot) Device Fingerprint for Service Delivery

Another preferred embodiment of the present invention provides a method for identifying one or more services for a user's network-connected smart device. In one preferred embodiment, the method operates as follows:

1. A smart device fingerprint is generated for the network-connected smart device. The smart device fingerprint includes at least the following data:
   i. device metadata of the network-connected smart device,
   ii. vulnerability profile of the network-connected smart device, and
   iii. anomaly and/or behavior metadata of the network-connected smart device The vulnerability profile is also known in the art, and interchangeably referred to herein, as a "vulnerability assessment" or a "vulnerability scan".

2. Electronically communicate the smart device fingerprint for the network-connected smart device to a processor via an electronic network, such as the Internet. (The processor is interchangeably referred to herein as a "smart device fingerprint processor.")
3. Analyze the data in the smart device fingerprint for the network-connected smart device in the processor and identify one or more services based on the data in the smart device fingerprint for the network-connected smart device.

Figure 3A:
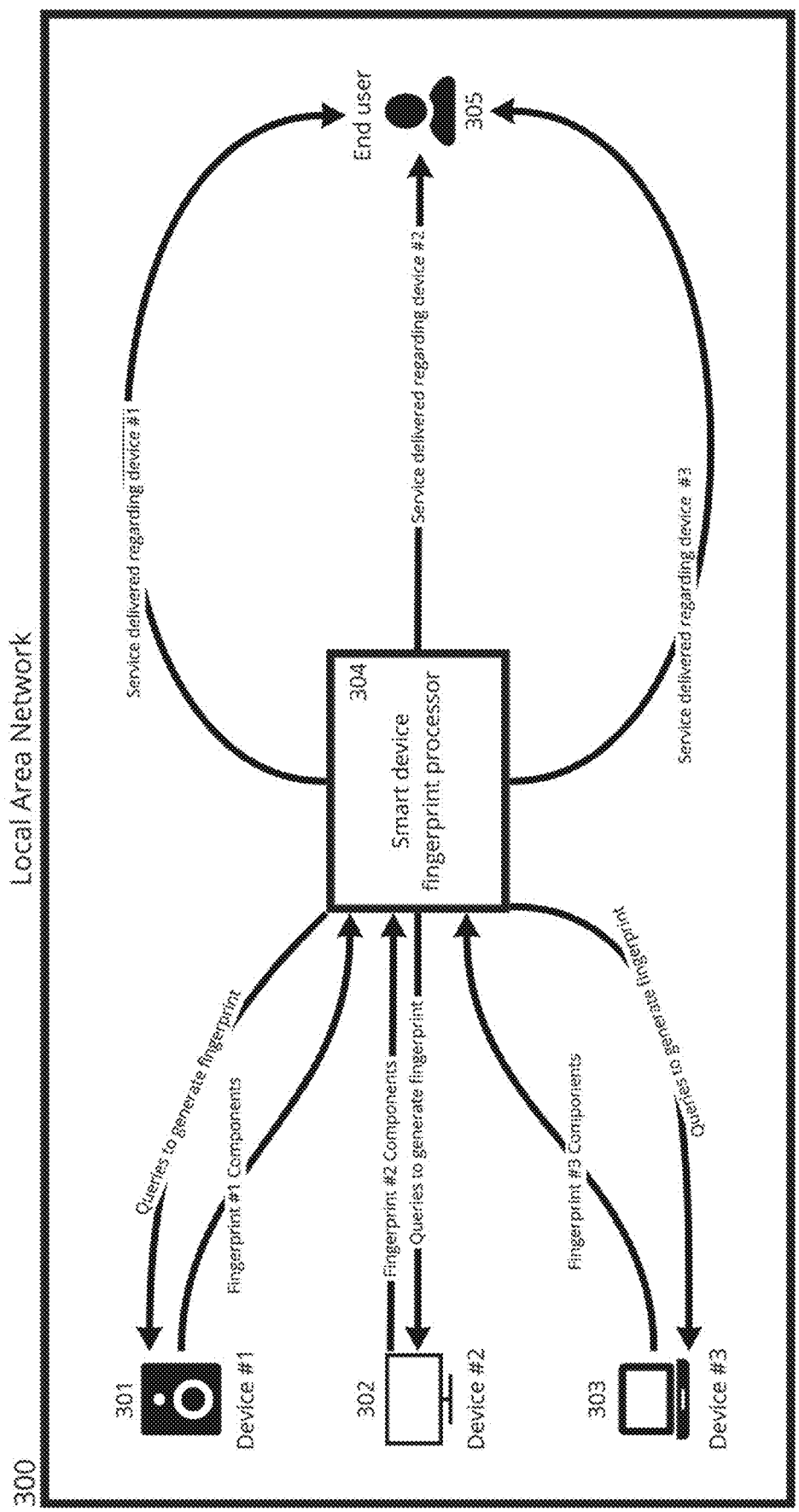

FIG. 3A is a schematic diagram of local area network 300 having three smart devices (devices) operating thereon, namely, device #1 (301), device #2 (302), and device #3 (303). Each of the devices receive a query to generate a fingerprint from smart device fingerprint processor 304, and each of the devices return respective fingerprint components #1, #2, and #3. Services are then identified by the smart device fingerprint processor 304 for each of the respective devices #1, #2, and #3 and delivered to end user 305.

The smart device fingerprint processor 304 is thus performing multiple functions, one of which is to communicate with the network devices to generate the smart device fingerprint data, another of which is to generate and deliver appropriate services to the end user 305. In one preferred embodiment, the smart device fingerprint function may be performed by a network device, such as an MITM gateway, and the generation and delivery of appropriate services to the end user 305 may be performed remotely by a cloud-based server. However, other architectures are within the scope of the present invention.

In one preferred embodiment, the user's network-connected smart device is associated with application (app) software that executes on a mobile device of the user, and the smart device fingerprint processor 304 electronically communicates the one or more identified services to the application (app) software executing on the mobile device of the user, thereby delivering the one or more identified services to the mobile device of the user (end user 305).

Figure 3B:
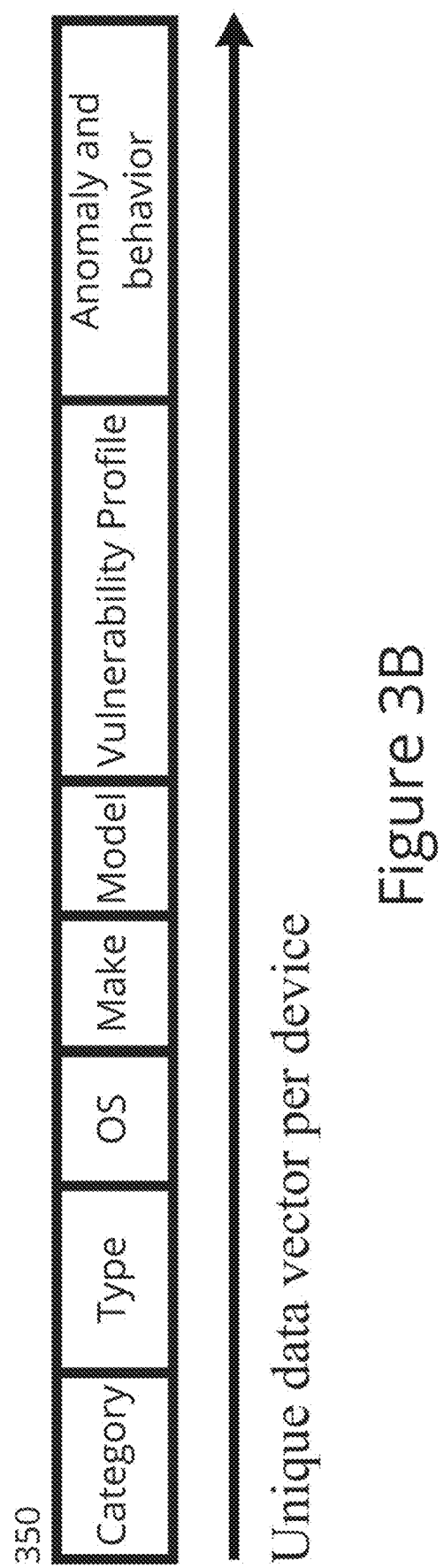
FIG. 3B shows a high-level view of a device fingerprint for one smart device in accordance with preferred embodiments of the present invention.

FIG. 3B is a high-level view of a device fingerprint for one smart device. There will be one unique data vector 350 per smart device. In the example of FIG. 3B, the smart fingerprint is a data vector that includes Category, Type, OS (operating system), Make, Model, Vulnerability Profile, and Anomaly and behavior. A specific example of the contents of this data is provided below.

i. Device metadata
    a. Category
      i. Home & Office
    b. Type
      i. Computer
    c. OS
      i. Windows
    d. Make
      i. TP-Link
    e. Model
      i. None
  ii. Vulnerability profile
    a. V1
      i. Port
        1. 8443
      ii. Service name
        1. HTTP
      iii. Service Product
        1. Apache Tomcat
      iv. Service Version
        1. 8.5.8
      v. Service Tunnel
        1. ssh
      vi. Id
        1. TOMCAT:E4520A0C2F785FBF22985309FA3E3B08
      vii. CVSS
        1. 9.3
      viii. Type
        1. Tomcat
    b. V2
      i. Port
        1. 3389
      ii. Service name
        1. ms-wbt-server
      iii. Service Product
        1. Microsoft Terminal Services
      iv. Service Version
        1. None
      v. Service Tunnel
        1. None
      vi. ID
        1. None
      vii. CVSS
        1. None
      viii. Type
        1. None
  iii. Behavioral metadata
    a. Malicious IP Contact Count (Weekly)
      i. 3
    b. Malicious IP contact Count (Daily)
      i. 1
    c. Device Score
      i. 7.2
    d. Communication Score
      i. 2
    e. Vulnerability Score
      i. 3
    f. Protocol changepoint detected
      i. 1
    g. Packet size changepoint detected
      i. 1
    h. Packet number changepoint detected
      i. 0
  iv. Anomaly metadata
    a. Estimated prior anomaly likelihood
      i. 0.82
    b. Estimated future anomaly likelihood
      i. 0.91
    c. Categorical risk likelihoods
      i. 0.5
      ii. 0.8
      iii. 0.3

In one preferred embodiment, the vulnerability profile may be stored in a database in a JSON format, as shown below.

```
BEGINNING OF JSON DATA FILE
{"device_id": 12418,
"vulnerabilities":
  {"vulnerability_1":
    {
      "port": 8443,
      "service name": "HTTP",
      "service product": "Apache Tomcat",
      "service version": "8.5.8",
      "service tunnel": "ssh",
      "ID": "TOMCAT:E4520A0C2F785FBF22985309FA3E3B08",
      "CVSS": 9.3,
      "Type": "Tomcat"
    },
  "vulnerability_2":
    {
      "port": 3389,
      "service name": "ms-wbt-server",
      "service product": "Microsoft Terminal Services",
      "service version": "None",
      "service tunnel": "None",
      "ID": "None",
      "CVSS": "None",
      "Type": "None"
    }
  }
}
END OF JSON DATA FILE
```

Referring again to the anomaly metadata, this may be similar to the anomalies identified above in Section A. (Crowdsourced Bayesian packet analysis anomaly detection) as a result of comparing the network traffic for the user's smart device with Bayesian priors, wherein the anomalies indicate potential abnormal data communication behavior regarding the user's smart device.

Referring again to the step of analyzing the data in the smart device fingerprint for the network-connected smart device in the processor and identifying one or more services based on the data in the smart device fingerprint for the network-connected smart device, the following Table 3 illustrates examples of smart device fingerprint components and the respective service(s) that may be identified as being suitable based on the analysis of the smart device fingerprint components.

TABLE 3

| Smart device fingerprint component | Service-related messages (these are text and graphics-based messages that are generated by a backend server and delivered as content to the user or to a third party) |
|---|---|
| Device category/type/make/model associated with dangerous IP contact of certain threshold | Provide optional IP blocking service for user device |
| | Generate and deliver content of category IP blocking and related to user's device category, type, make and/or model |

TABLE 3-continued

| | |
|---|---|
| Device metadata indicates threshold proportion of devices of make/model show known bad behavior | Generate and deliver recommendation content for user's device category, type, make and/or model |
| Vulnerability profile shows known vulnerability with known remedy | Generate and deliver recommendation content with known remedy (update device firmware, instructions to enable or disable a software function, disable contact of device to specific services, protocols, or functions) |
| Vulnerability profile shows known vulnerability with unknown remedy | Generate and deliver recommendations for unknown remedies (update device firmware if available, disable device internet access, content regarding replacement or upgrading current device) |
| Device metadata indicates a new device of specific category/type/make/model has joined the network | Generate and deliver content specific to that category/type/model (setup, usage recommendations, common mistakes, helpful tips, usage ideas) |
| Device anomaly threshold met | Alter monitoring frequency for given device to gather additional data |
| Vulnerability profile shows known vulnerability with no known fix and consistent involvement in established dangerous activity (example: botnet involvement) | Generate and deliver content specific to device blocking and/or alternative device as replacement |
| At user's request, provide recommendations for similar devices in category/type/make | Generate and deliver recommendation content for specified device category/type/make based on anomaly and behavior metadata |

To summarize the various examples above, one type of service is a recommendation based on the vulnerability profile to apply a specific update to the user's network-connected smart device. Another type of service is a notification based on the anomaly and behavior data indicating that the user's network-connected smart device is communicating with one or more suspect entities, such as suspect IP locations, or network addresses, or IP addresses. Another type of service is the delivery of targeted content associated with the user's network-connected smart device, wherein the targeted content is selected based on device metadata, such as Brand/Model. Another type of service is a notification based on the device metadata that the user should upgrade or replace the user's network-connected smart device.

Table 4 below shows sample service-related messages that may appear on a user's mobile device via an app executing on the mobile device, such as a smartphone app. Other communication channels for delivery of the service-related messages are within the scope of the present invention, such as email or text messages. Also, other user devices for receiving the service-related messages are within the scope of the present invention, such as a desktop computer, laptop, or tablet computer.

TABLE 4

| | |
|---|---|
| Device category/type/make/model associated with dangerous IP contact of certain threshold | Your device "Smart Thermostat" contacted a known-bad IP address on Oct. 8,2021 at 7:34am. It is being monitored for further dangerous behavior, would you like to block it from the internet? |
| Device metadata indicates threshold proportion of devices of make/model show known bad behavior | Your device "Cable Box" is being contacted by a known command-and-control server for a botnet. This may result in it getting used to attack other networks, and will slow down your home network. We can block requests it is making to these servers and keep you informed if it gets worse. |
| Vulnerability profile shows known vulnerability with known remedy | Your device "Cable box" is vulnerable to a common exploit. Updating it to its latest firmware should fix this and make it safe to use again. |
| Vulnerability profile shows known vulnerability with unknown remedy | Your device "Cable Box" is vulnerable to 5 severe vulnerabilities. This may result in it getting used to attack other networks, and will slow down your home network. We recommend request a replacement from your cable provider. |
| Device metadata indicates a new device of specific category/type/make/model has joined the network | New device "M's iPhone" has joined the network, here's the latest we have on iPhone security. |
| Vulnerability profile shows known vulnerability with no known fix and consistent involvement in established dangerous activity (example: botnet involvement) | Your device "Smart light bulb" has had 3 problems in the last day. The following article outlines alternative smart light bulbs that we recommend based on their performance in our testing. |
| At user's request, provide recommendations for similar devices in category/type/make | Here are the top 3 devices we recommend in category "Smart Thermostat". Click here to read reviews and understand why we have selected these products. |

D. Predictive Device-Based Crowdsource Security

Another preferred embodiment of the present invention provides an automated method of predicting network vulnerability of a user's network-connected smart device, wherein the user's network-connected smart device has one or more device classifications. In one preferred embodiment, the method operates as follows:
1. Store in memory at least the following information:
   a. A plurality of crowdsourced vulnerability profiles generated from individual vulnerability profiles of a plurality of network-connected smart devices. Each crowdsourced vulnerability profile is generated from individual vulnerability profiles of a plurality of network-connected smart devices having one of the same device classifications, and each of the individual vulnerability profiles is created from network scans for the respective network-connected smart device.
   b. Anomalous behavior associated with each of the respective crowdsourced vulnerability profiles.
2. Generate, by a processor, a vulnerability profile of the user's network-connected smart device,
3. Identify, by the processor, one or more of the crowdsourced vulnerability profiles in the memory that matches the vulnerability profile of the user's network-connected smart device by matching the one or more device classifications of the user's network-connected smart device with the device classifications of the crowdsourced vulnerability profiles in the memory, thereby also identifying anomalous behavior that the user's network-connected smart device is at risk of exhibiting. The anomalous behavior will be the same anomalous behavior identified by the respective matching one or more crowdsourced vulnerability profiles.

Consider a specific example wherein one of one of the device classifications is a category type. In this example, the memory stores a plurality of crowdsourced vulnerability profiles generated from individual vulnerability profiles of a plurality of network-connected smart devices having the same category type. The user's network-connected smart device has a category type. In this example, the processor identifies one or more of the crowdsourced vulnerability profiles in the memory that matches the vulnerability profile of the user's network-connected smart device by matching the category type of the user's network-connected smart device to the category types of the crowdsourced vulnerability profiles in the memory.

Consider another specific example wherein one of the device classifications is a device type. In this example, the memory stores a plurality of crowdsourced vulnerability profiles generated from individual vulnerability profiles of a plurality of network-connected smart devices having the same device type. The user's network-connected smart device has a device type. In this example, the processor identifies one or more of the crowdsourced vulnerability profiles in the memory that matches the vulnerability profile of the user's network-connected smart device by matching the device type of the user's network-connected smart device to the device types of the crowdsourced vulnerability profiles in the memory.

Consider another specific example wherein one of the device classifications is a device make. In this example, the memory stores a plurality of crowdsourced vulnerability profiles generated from individual vulnerability profiles of a plurality of network-connected smart devices having the same device make. The user's network-connected smart device has a device make. In this example, the processor identifies one or more of the crowdsourced vulnerability profiles in the memory that matches the vulnerability profile of the user's network-connected smart device by matching the device make of the user's network-connected smart device to the device makes of the crowdsourced vulnerability profiles in the memory.

Consider another specific example wherein one of the device classifications is a device model. In this example, the memory stores a plurality of crowdsourced vulnerability profiles generated from individual vulnerability profiles of a plurality of network-connected smart devices having the same device model. The user's network-connected smart device has a device model. In this example, the processor identifies one or more of the crowdsourced vulnerability profiles in the memory that matches the vulnerability profile of the user's network-connected smart device by matching the device model of the user's network-connected smart device to the device models of the crowdsourced vulnerability profiles in the memory.

Consider another specific example wherein one of the device classifications is a device OS. In this example, the memory stores a plurality of crowdsourced vulnerability profiles generated from individual vulnerability profiles of a plurality of network-connected smart devices having the same device OS. The user's network-connected smart device has a device OS. In this example, the processor identifies one or more of the crowdsourced vulnerability profiles in the memory that matches the vulnerability profile of the user's network-connected smart device by matching the device OS of the user's network-connected smart device to the device OS's of the crowdsourced vulnerability profiles in the memory.

The following example illustrates crowdsourced vulnerability profiles for Smart Home/Thermostat/Nest Thermostat/Gen.3 Version 3.4:

Step 1: Return results from database of all vulnerability reports:
  i. All devices matching model Gen.3 Version 3.4 (or other criteria)
  ii. Collected within a defined period (past week, past month)
FIG. 5 shows an example of collected data.
Step 2: Identify whether returned exemplars differ within features including but not limited to:
  i. Operating system version (referring to FIG. 5—version 3.2 show identified vulnerability, whereas version 3.3 does not)
  ii. Firmware version
  iii. Port service version
  iv. Open ports
  v. Auxiliary software or service versions
Step 3: Return results from database of all reported behaviors within the same time period used above, including but not limited to:
  i. Flagged IP address contacts
  ii. Malware transmission
  iii. Sensitive data transmission
  iv. Hacking software usage
  v. Port scanning
  vi. DHCP, DNS, or ARP spoofing attacks
Example:
  Device 1:
    Bad IP Contacts: 3
      i. IP1: 7.219.120.8
        Timestamp: 2021-11-14T16:21.181234
      ii. IP2: 248.212.8.2
        Timestamp: 2021-11-14T16:13.142330
      iii. IP3: 124.210.39.7
        Timestamp: 2021-11-14T12:48.588911
    Malware transmission:
      i. Event Timestamp: 2021-11-15T01:32.53278
      ii. Malware ID: Ransomware-Petya-124892
Step 4: If there are any reported behaviors, identify:
  i. Distribution of features from Step 2 in devices reporting behaviors
    In the example above, the OS Version variable is equally distributed between two versions, and so is the identified vulnerability ID.
  ii. Whether there are feature values for which behaviors are more or less frequent
    In the example above, vulnerabilities are present (more frequent) in the OS version 3.2 than in version 3.3
  iii. Whether there are additional resources from external vendors that link the identified vulnerability present in the same device(s) to established remedies for retrieved behaviors. Sites such as: https://vulners.com/packetstorm/PACKETSTORM:153278 provide an example of an accessible external data service with a recommended remedy.
Step 5: for a device meeting criteria above, and that has not yet produced one of the flagged behaviors, produce and store a probability (in the above, a 100% chance that a version 3.2 device will produce this behavior) that this device will produce a flagged behavior based empirically on current rates of behaviors Anomalous behavior identified by respective crowdsourced vulnerability profiles may then be stored in a database. FIG. 6 is a graphical depiction of a table format for organizing this data. Each vulnerability profile refers to a specific crowdsourced vulnerability profile at either a category type level, device type level, make level, model level, or OS level (e.g., smart refrigerators, Samsung smart refrigerators, Apple devices running OS version 15.3).

The process for generating a vulnerability profile of a user's network-connected smart device uses the same techniques described above, and thus is not described further herein.

The process of identifying the crowdsourced vulnerability profile in the memory that matches the category type/make/model/OS of the user's network-connected smart device involves a straightforward matching process, examples of which are provided below.

User smart device: Google Nest Model Gen.3/Version 3.4
    Locate crowdsourced vulnerability profile for:
        Category: Smart Home
        Type: Thermostat
        Make: Google Nest
        Model: Gen.3/Version 3.4

User smart device: Roku Premiere+ Model 4630
    Locate crowdsourced vulnerability profile for:
        Category: Smart Home
        Type: Media Player
        Make: Roku
        Model: Premiere+ Model 4630

User smart device: Apple Macbook Pro 15,1
    Locate crowdsourced vulnerability profile for:
        Category: Home Office
        Type: Laptop
        Make: Apple:
        Model: Macbook Pro MacBookPro 15,1

FIG. 4 shows an example process for two example device classifications. ("Devices" as used herein refer to "smart devices" and "example device" is a "user's smart device.") In example 1 (361), a single vulnerability is identified alongside an anomalous behavior in 25% of devices of this device classification. For an example device (363) of this classification, then that example device (363) is identified to have that same example vulnerability. Using simplified math, a likelihood of 25% is calculated that this device will demonstrate an anomaly of the same type. In example 2 (362), five vulnerabilities are identified in a device classification. Within the device classification, when those five vulnerabilities are present, 100% of devices show an anomalous behavior of type I, and 90% show an anomalous behavior of type II. An example device of this classification (364) that shows those same five vulnerabilities is then considered, and using simplified math, are calculated to have a 100% chance of showing anomalous behavior of type I, and a 90% chance of showing anomalous behavior of type II.

Similar to the "Smart (Iot) device fingerprint for service delivery" described in Section C above, the user's network-connected smart device may be associated with application software that executes on a mobile device of the user (e.g., a smartphone app), wherein the processor electronically communicates to the application software executing on the mobile device of the user information regarding the anomalous behavior that the user's network-connected smart device is at risk of exhibiting.

Table 5 below shows sample messages that may appear on a user's mobile device via an app executing on the mobile device, such as a smartphone app. Other communication channels for delivery of the service-related messages are within the scope of the present invention, such as email or text messages. Also, other user devices for receiving the service-related messages are within the scope of the present invention, such as a desktop computer, laptop, or tablet computer.

TABLE 5

| Anomalous behavior prediction | Resulting content |
| --- | --- |
| Threshold likelihood reached for future anomalous behavior | Based on other devices of its type, your smart light bulb has a high probability of being compromised. Would you like to block device "smart light bulb"? |
| Threshold proportion of devices in specific classification running known-malicious behavior | 534 other media players of the same model as your "Living room media player" are currently being used in a denial of service attack. Would you like to block your media player before it becomes involved? |
| Specific vulnerability profile with high likelihood of dangerous activity detected, with available remedy | Your device "Smart TV" is running an outdated firmware with known problems that may result in it becoming exploited. Please apply the update available in its menu to avoid this, and we will monitor it to verify that it is safe. |

If no anomalous behavior is identified, then no message is communicated to the user.

One advantage of this predictive process over other techniques described herein is that it is not necessary to collect and analyze actual network traffic of the user's smart device. Instead, the predictive process compares the vulnerability profile of the smart device to crowdsourced vulnerability profiles to predict likely behavior of the user's smart device.

III. Additional Considerations

A. Additional Bayesian Priors

In addition to the Bayesian priors discussed above (category type, device type, device make, device model), there may be other Bayesian priors for device classifications such as firmware, board, chip, technology stack, and components of the device. Examples of these additional device classifications are provided below:

i. Technology Stack:

Some vulnerabilities will exist in commonly used pieces of software, like open-source databases (PostgreSQL, SQLite), or combinations of systems like the common ELK stack (Elasticsearch, Logstash, Kibana). These software programs may ship with their own vulnerabilities (for example, CVE-2022-21724, CVE-2021-23404, CVE-2021-37939). In these cases, the common analysis may be by devices with common, identified underlying exposed software, or combinations of software, and versions of that software.

ii. Board

Many devices can be manufactured on the same hardware basis. This is true within manufacturers, where reusing basic underlying hardware saves costs, and across manufacturers where a simple system, like a system-on-a-chip (SoC) off the shelf may be cheaper to acquire than to produce from scratch (for example, manufacturers like Espressif, Nordic Semiconductor). This results in common drivers and firmware, which are then exposed (for example, CVE-2019-17391, CVE-2020-12638, CVE-2020-27211). In these cases, the common analysis may either know beforehand or discover through statistical analysis that multiple products have similar or identical components, suggesting that using an analysis and accompanying Bayesian prior specific to this underlying hardware will produce meaningful predictions for all products based on that hardware.

iii. Chip or Firmware:

Many basic components are ubiquitous at the chip level, including the network interface cards (NICs) that are used on Wi-Fi, Bluetooth, and ethernet connections. These components may run standard firmware, which may itself contain exploitable vulnerabilities (for example, CVE-2019-15126).

B. Alternative Embodiments of Smart (IoT) Device Fingerprint for Service Delivery In the embodiment discussed above in section C, the smart device fingerprint is generated from at least the following data:

(i) device metadata of the network-connected smart device, (ii) vulnerability profile of the network-connected smart device, and (iii) one or more of (A) anomaly metadata of the network-connected smart device, and (B) behavior metadata of network-connected smart device.

The data in the smart device fingerprint for the network-connected smart device is then analyzed and one or more services are identified based on the data in the smart device fingerprint for the network-connected smart device. However, in alternative embodiments, the smart device fingerprint may be generated from only one of data elements (i)-(iii), or the smart device fingerprint may be generated from a subcombination of any two of these three data elements, and a service may be identified based on an analysis of the modified smart device fingerprint.

In yet another alternative embodiment, the same full smart device fingerprint is formed as described above in section C, except that only a portion of the smart device fingerprint (e.g., only the portion associated with data elements (i), or (ii), or (iii), or any subcombination thereof) is used in the analysis stage to identify the one or more services.

To most accurately identify appropriate services, it is preferable to use more data elements than less data elements in the analysis process. However, any of these alternative embodiments may still be commercially viable for certain applications. For example, just knowing the make and model of a smart device (which is part of the device metadata) may be sufficient to inform a user that a particular smart device has been recalled or should immediately be taken offline. Likewise, just knowing the current OS of a smart device (which is also part of the device metadata) may be sufficient to inform a user that a particular smart device may need an OS update.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method of detecting anomalies in network packet header data associated with a user's smart device that is in communication with one or more external sources via an electronic network, the user's smart device having one or more device classifications, the method comprising:

(a) storing in memory Bayesian priors of network traffic obtained from network packet header data crowdsourced from a plurality of smart devices having one of the same device classifications as the user's smart device;

(b) capturing network traffic obtained from network packet header data for the user's smart device; and (c) comparing the network traffic for the user's smart device with the Bayesian priors of network traffic obtained from network packet header data crowdsourced from a plurality of smart devices having one of the same device classifications as the user's smart device and identifying any anomalies, wherein the anomalies indicate potential abnormal data communication behavior regarding the user's smart device.

2. The method of claim 1 wherein one of the device classifications is a category type, and wherein the memory stores Bayesian priors of network traffic obtained from network packet header data crowdsourced from a plurality of smart devices having the same category type as the user's smart device, and wherein the comparison is performed using the Bayesian priors of network traffic obtained from network packet header data crowdsourced from a plurality of smart devices having the same category type as the user's smart device.

3. The method of claim 1 wherein one of the device classifications is a device type, and wherein the memory stores Bayesian priors of network traffic obtained from network packet header data crowdsourced from a plurality of smart devices having the same device type as the user's smart device, and wherein the comparison is performed using the Bayesian priors of network traffic obtained from network packet header data crowdsourced from a plurality of smart devices having the same device type as the user's smart device.

4. The method of claim 1 wherein one of the device classifications is a device make, and wherein the memory stores Bayesian priors of network traffic obtained from network packet header data crowdsourced from a plurality of smart devices having the same device make as the user's smart device, and wherein the comparison is performed using the Bayesian priors of network traffic obtained from network packet header data crowdsourced from a plurality of smart devices having the same device make as the user's smart device.

5. The method of claim 1 wherein one of the device classifications is a device model, and wherein the memory stores Bayesian priors of network traffic obtained from network packet header data crowdsourced from a plurality of smart devices having the device model as the user's smart device, and wherein the comparison is performed using the Bayesian priors of network traffic obtained from network packet header data crowdsourced from a plurality of smart devices having the same device model as the user's smart device.

6. The method of claim 1 wherein the comparison performed in step (c) is for (i) network packet data crowdsourced from a plurality of smart devices having one of the same device classifications as the user's smart device, and (ii) network packet data obtained from the user's smart device for the same time period.

* * * * *